(12) United States Patent
Kim (10) Patent No.: US 11,829,003 B2
(45) Date of Patent: Nov. 28, 2023

(54) TELEPHOTO LENS OPTICAL SYSTEM WITH LARGE APERTURE AND INNER-FOCUS TYPE

(71) Applicant: SAMYANG OPTICS CO., LTD, Changwon-si (KR)

(72) Inventor: Moon Kyung Kim, Changwon-si (KR)

(73) Assignee: SAMYANG OPTICS CO., LTD, Changwon-si (KR)

( * ) Notice: Subject to any disclaimer, the term of this patent is extended or adjusted under 35 U.S.C. 154(b) by 30 days.

(21) Appl. No.: 17/364,231

(22) Filed: Jun. 30, 2021

(65) Prior Publication Data

US 2023/0003970 A1    Jan. 5, 2023

(51) Int. Cl.
*G02B 9/14* (2006.01)
(52) U.S. Cl.
CPC ...................................... *G02B 9/14* (2013.01)

(58) Field of Classification Search
CPC .............. G02B 13/006; G02B 13/0045; G02B 27/0025
See application file for complete search history.

(56) References Cited

U.S. PATENT DOCUMENTS

2017/0010441 A1* 1/2017 Kondo .................... G03B 13/36

\* cited by examiner

*Primary Examiner* — Jack Dinh
(74) *Attorney, Agent, or Firm* — Studebaker & Brackett PC (57) ABSTRACT

A lens optical system includes a first lens group in which a first lens of an object side is composed of a meniscus lens having a positive refractive power, and having a positive refractive power as a whole, a second lens group arranged closer to an image side I than the first lens group, the second lens group being a focusing group for correcting a change in image distance depending on a change in object distance, being composed of a single lens, and having a negative refractive power as a whole, and a third lens group arranged closer to the image side I than the second lens group, the third lens group including a plurality of lenses and having a positive refractive power as a whole.

5 Claims, 7 Drawing Sheets

TELEPHOTO LENS OPTICAL SYSTEM WITH LARGE APERTURE AND INNER-FOCUS TYPE

BACKGROUND

1. Technical Field

The present invention relates to a lens optical system for photographing and a photographing apparatus including the same. In particular, it relates to a lens optical system which guarantees a high resolution and a fast focusing with one inner lens in a quasi-telephoto lens optical system with a large aperture.

2. Description of the Related Art

Recently, miniaturization of photographing apparatuses, power saving functions, or the like have been required, and miniaturization of photographing devices using solid-state imaging devices such as CCD (charge-coupled devices) type image sensors or CMOS (complementary metal-oxide semiconductor) type image sensors have been required. Such photographing apparatuses include digital still cameras, video cameras, interchangeable lens cameras, or the like.

In addition, since the photographing apparatuses using the solid-state imaging devices are suitable for miniaturization, it is also applied to small information terminals such as mobile phones. Users have demands for high performance such as high resolution, a wide angle, or the like. In addition, as consumer expertise in cameras continues to increase, demand for short focal length lens systems such as wide-angle lens systems and telephoto lens systems is increasing.

In particular, a camera of the same type as a CSC (compact system camera) is a form that removes a penta-prism or a reflection mirror from tan existing DSLR (digital single lens reflex). Therefore, it has the benefit of being relatively small in volume and light, so it has good mobility and is easy to carry. However, in such a CSC, interchangeable lenses using a full-frame imaging device are required to obtain high-quality photographs. The larger the size of the imaging device, the larger the interchangeable lens and the larger the volume. When the interchangeable lens coupled to the CSC becomes heavy, it decreases portability and convenience. Therefore, even if a full-frame imaging device is used, it is necessary to reduce an overall length of a product to some extent. To this end, an inner focus type can be used, in which the overall length is fixed during the focusing operation.

Generally, it is necessary to move a particular lens group in the lens optical system in order to correct the change of imaging point according to the change of the object position. The conventional interchangeable lenses use various types for moving lens groups, such as a front type for moving a front lens group, a rear type for moving a rear lens group, an inner lens type for moving only an inner lens group, and a focusing type for moving a plurality of lens groups.

A typical type among them is known as a floating type for moving all the lenses in the optical system or for moving two or three lens groups at the same time. In this type, the weight of lens groups that should be moved is considerably heavy and thus it causes a high load of a driving source such as a motor and consumes more power accordingly.

Specifically, it needs to implement a focusing for a video capture, by moving continuously a particular lens group related to an autofocus (AF) in small quantity to capture images and determining a contrast of the images. In this case, the stepping motor is preferable as a driving source, but it is not suitable for moving heavy lens groups because of its low torque from the driving source.

In this regard, it is necessary to implement a focusing by moving the least number of lenses in the lens optical system in order to minimize the weight of lens groups in motion.

SUMMARY

An aspect of the present invention provides a lens optical system for enabling a high-speed autofocus with a sufficient performance, using only a single focusing lens.

Another aspect of the present invention provides a lens optical system in which high refractive and low dispersive lenses are properly arranged in order to correct various aberrations occurred in the lens optical system with a large aperture.

However, aspects of the present invention are not restricted to those set forth herein. The above and other aspects of the present invention will become more apparent to one of ordinary skill in the art to which the present invention pertains by referencing the detailed description of the present invention given below.

According to an aspect of an exemplary embodiment, there is provided a lens optical system, comprising: A lens optical system, comprising: a first lens group in which a first lens of an object side is composed of a meniscus lens having a positive refractive power, and having a positive refractive power as a whole; a second lens group arranged closer to an image side I than the first lens group, the second lens group being a focusing group for correcting a change in image distance depending on a change in object distance, being composed of a single lens, and having a negative refractive power as a whole; and a third lens group arranged closer to the image side I than the second lens group, the third lens group including a plurality of lenses and having a positive refractive power as a whole, wherein when the second lens group is focused while moving, the first lens group and the third lens group are fixed to have a constant length of an overall length.

The lens optical system may satisfy the following equation:

$$3.8 \leq \frac{FL}{BFL} \leq 4.5,$$

wherein BFL is a distance from the last lens surface of the third lens group to a imaging device surface (IMG), and FL is a distance from the first lens surface of the first lens group to the imaging device surface (IMG).

The lens optical system may further satisfy the following equation: $0.5 \leq \tan w \leq 0.7$, wherein w is the field of view of the lens optical system.

An aspherical lens may be included in each of the first to the third lens group.

The first lens group having the positive refractive power as a whole may include double-junction lenses which have a negative refractive power.

The lens optical system may further satisfy the following equation:

$$9 \leq \frac{L_1 + L_3}{2fd} \leq 17,$$

wherein, $L_1$ is a distance from the first lens to the last lens in the first lens group, L3 is a distance from the first lens to the last lens in the third lens group, and 2fd is a travel range of the single lens in the second lens group when focusing from infinity to the nearest distance.

The lens optical system may further satisfy the following equation:

$$-0.69 \leq \frac{R2_{rear}}{f2} \leq -0.55,$$

wherein, $R2_{rear}$ is a curvature radius of the last lens surface of the single lens in the second lens group and f2 is a focal length of the second lens group.

The lens optical system may further satisfy the following equation:

$$0.55 \leq \frac{1}{n_{av}} \leq 0.61,$$

wherein, $n_{av}$ is an average refractive index of all the lenses used in the lens optical system.

BRIEF DESCRIPTION OF THE DRAWINGS

The above and other aspects and features of the present invention will become more apparent by describing in detail exemplary embodiments thereof with reference to the attached drawings, in which.

DETAILED DESCRIPTION OF THE EMBODIMENTS

Advantages and features of the disclosure and methods to achieve them will become apparent from the descriptions of exemplary embodiments herein below with reference to the accompanying drawings. However, the inventive concept is not limited to exemplary embodiments disclosed herein but may be implemented in various ways. The exemplary embodiments are provided for making the disclosure of the inventive concept thorough and for fully conveying the scope of the inventive concept to those skilled in the art. It is to be noted that the scope of the disclosure is defined only by the claims. Like reference numerals denote like elements throughout the descriptions.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and/or the present application, and will not be interpreted in an idealized or overly formal sense unless expressly so defined herein.

Terms used herein are for illustrating the embodiments rather than limiting the present disclosure. As used herein, the singular forms are intended to include plural forms as well, unless the context clearly indicates otherwise. Throughout this specification, the word "comprise" and variations such as "comprises" or "comprising," will be understood to imply the inclusion of stated elements but not the exclusion of any other elements.

Hereinafter, an embodiment of the present invention will be described in detail with reference to the accompanying drawings.

Figure 1:
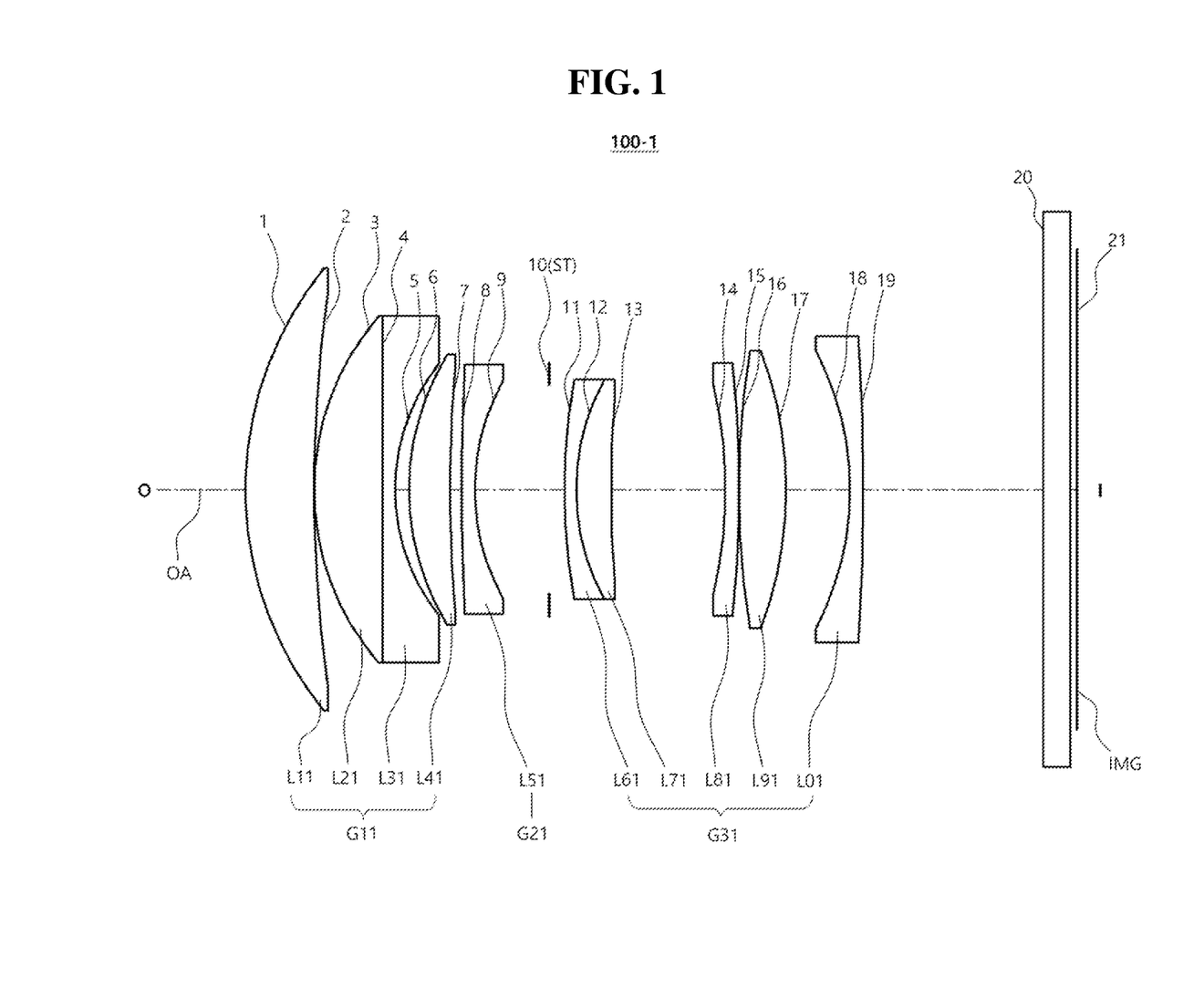
FIG. 1 is a view showing an optical layout showing an arrangement of lens components in a lens optical system according to a first embodiment of the present invention.

FIG. 1 is a view showing an optical layout showing an arrangement of lens components in a lens optical system according to a first embodiment of the present invention.

A lens optical system 100-1 includes a first lens group G11 having a positive refractive power, a second lens group G21 having a negative refractive power, and a third lens group G31 having a positive refractive power, which are arranged in order from an object side O to an image side I. In focusing, the first lens group G11 and the third lens group G31 are fixed to maintain a constant length of the overall length, and the second lens group G21 which is comprised of one lens in the middle may be moved.

Hereinafter, the image side I may indicate a direction where an image plane IMG is positioned, in which an image is formed on the image plane IMG, and the object side O may indicate a direction in which a subject is positioned. In addition, the "object side" of a lens means, for example, the left side of the drawing toward a lens surface where the subject is positioned. "back side of the image I" may indicate the right side of the drawing toward a lens surface where the image plane is positioned. The image plane IMG may be, for example, an imaging device surface or an image sensor surface. The image sensor may include, for example, a sensor such as a CMOS (complementary metal oxide semiconductor) image sensor or a CCD (charge coupled device). The image sensor is not limited thereto, and may be, for example, a device that converts an image of a subject into an electrical image signal.

In the lens optical system according to various embodiments, the first lens group G11 may embody a wide angle by emitting light with a positive refractive power. In addition, an aperture ST may be arranged between the first lens group G11 and the second lens group G21.

When focusing from infinity to the nearest distance, the first lens group G11 and the third lens group G31 are fixed, the second lens group G21 may move independently and moves from the image side I to the object side O. When the first lens group G11 and the third lens group G31 are fixed in focusing, damage or impairment to the lens due to the protrusion of the first lens group G11 may be reduced, and it may contribute to miniaturization of the lens optical system by preventing an increase in length of the overall length.

In a general wide-angle lens optical system, a diameter of a lens positioned closest to the object side O increases, and an aspheric surface may be employed inside the first lens group positioned closest to the object side O so as to minimize aberration changes due to focusing. Further, in the present invention, an aspheric lens may be provided in the third lens group having a relatively small aperture. In a bright lens optical system having a small F number Fno, the aspheric lens must be employed to achieve sufficient resolution performance and small distortion. Therefore, the aspheric surface is employed, in which the aspheric surface is employed in the third lens group G31 positioned at the rear of the small aperture so that the maximum resolution performance may be obtained at a small cost. Preferably, the aspheric surface may be employed on the object side O surface of the lens positioned on the image side I immediately behind the aperture ST in order to increase the center resolution performance. In addition, the aspheric lens may be arranged on the uppermost side I of the third lens group G31 for correction of astigmatism and distortion.

Referring to FIG. 1, the first lens group G11 may include a first lens L11 having a positive refractive power, a second lens L21 having a positive refractive power, a third lens L31 having a negative refractive power, and a fourth lens L41 having a positive refraction power. Among them, the second lens L21 and the third lens L31 may be double-junction lenses bonded to each other.

Each lens L11 to L41 may have a meniscus shape convex toward the object side O, the first lens L11, the second lens L21 and the fourth lens L41 may be a convex lens, and the third lens L31 may be a concave lens.

The second lens group G21 may be comprised of a fifth lens L51 having a negative refractive power. The fifth lens L51 may be a concave lens and have the meniscus shape convex toward the object side O.

The third lens group G31 may include a sixth lens L61 having a negative refractive power, a seventh lens L71 having a positive refractive power, an eighth lens L81 having a negative refractive power, a ninth lens L91 having a negative refractive power and a tenth lens L01 having a negative refractive power. The sixth lens L61 and the seventh lens L71 may have the meniscus shape convex toward the image side I and may be double-junction lenses bonded to each other. In addition, the eighth lens L81 and the tenth lens L01 may have the meniscus shape convex toward the image side I and the ninth lens L91 may be a biconvex lens.

The lens optical system according to the first embodiment has the following characteristic values as a whole by a combination of individual lenses. Here, f denotes a focal length, Fno denotes an F number, and HFOV denotes a half angle of view.

f=70 mm, Fno: 1.86, HFOV=17.2°

In addition, detailed design data of the lenses included in the lens optical system is shown in Table 1 below. The design data indicates information such as a curvature radius of a lens, a thickness of a lens, an interval between lenses, a material of a lens material, or the like. Here, an object on the lens surface is added with a number (see the numbering of 1 to 21 in FIG. 1) indicating a surface of all lenses arranged from the object to the image. In addition, the unit of Radius and Thickness is mm, "nd" denotes a refractive index, and "vd" denotes an Abbe number.

TABLE 1

| Surface | Radius | Thickness | nd | vd | Note |
|---|---|---|---|---|---|
| Object | Inf | D0 | | | |
| 1 | 37.1102 | 6.949 | 1.92286 | 20.88 | Group 1 |
| 2 | 158.4905 | 0.1 | | | (Fix) |
| 3 | 27.8257 | 6.849 | 1.497 | 81.61 | |
| 4 | 2251.825 | 1.3 | 1.92286 | 20.88 | |
| 5 | 21.2169 | 1.431 | | | |
| 6 | 27.3929 | 4.185 | 1.7725 | 49.62 | |
| 7 | 185.9536 | D1 | | | |
| 8 | 458.1062 | 1.3 | 1.713 | 53.94 | Group 2 |
| 9 | 24.8847 | D2 | | | (Focusing) |
| 10 (STO) | inf | 1.5 | | | Group 3 |
| 11 | 63.7961 | 1.3 | 1.92286 | 20.88 | (Fix) |
| 12 | 23.906 | 3.451 | 1.7725 | 49.62 | |
| 13 | 122.1607 | 11.703 | | | |
| 14 | −49.2877 | 1.3 | 1.497 | 81.61 | |
| 15 | −139.694 | 0.1 | | | |
| 16 | 100.9414 | 4.823 | 2.001 | 29.13 | |
| 17 | −40.1384 | 6.469 | | | |
| 18 | −31.1879 | 1.3 | 1.54072 | 47.2 | |
| 19 | −267.223 | 18.419 | | | |
| 20 | inf | 2.5 | 1.5168 | 64.2 | Filter |
| 21 | inf | D3 | | | |

Further, zoom data of the lens optical system according to the first embodiment when it is at infinity and at 0.69 m in the first embodiment, is shown in Table 2 below. Here, D0 to D2 denote a variable distance, and "in Air" denotes a distance from the last surface of the optical system to the imaging device when there is no filter positioned in front of the imaging device. In addition, FOV is a field of view, which means a size of an area visible to the imaging device, and Fno means an F number. In addition, OAL denotes an overall length of the lens optical system, and denotes a distance from the object side to the image plane of the lens closest to the object side O of the lens optical system.

TABLE 2

| Config | Infinity | TL = 0.69 m |
|---|---|---|
| D0 | infinity | 609.9905 |
| D1 | 1.25809 | 5.14002 |
| D2 | 7.57448 | 3.69256 |
| D3 | 0.5 | 0.5 |
| in Air | 20.633 | 20.725 |
| EFL/MAG | 70 | 0.12161 |
| FOV | 17.195 | 14.57 |
| F/# | 1.857 | 1.938 |
| OAL | 84.313 | 84.313 |

Figure 2:
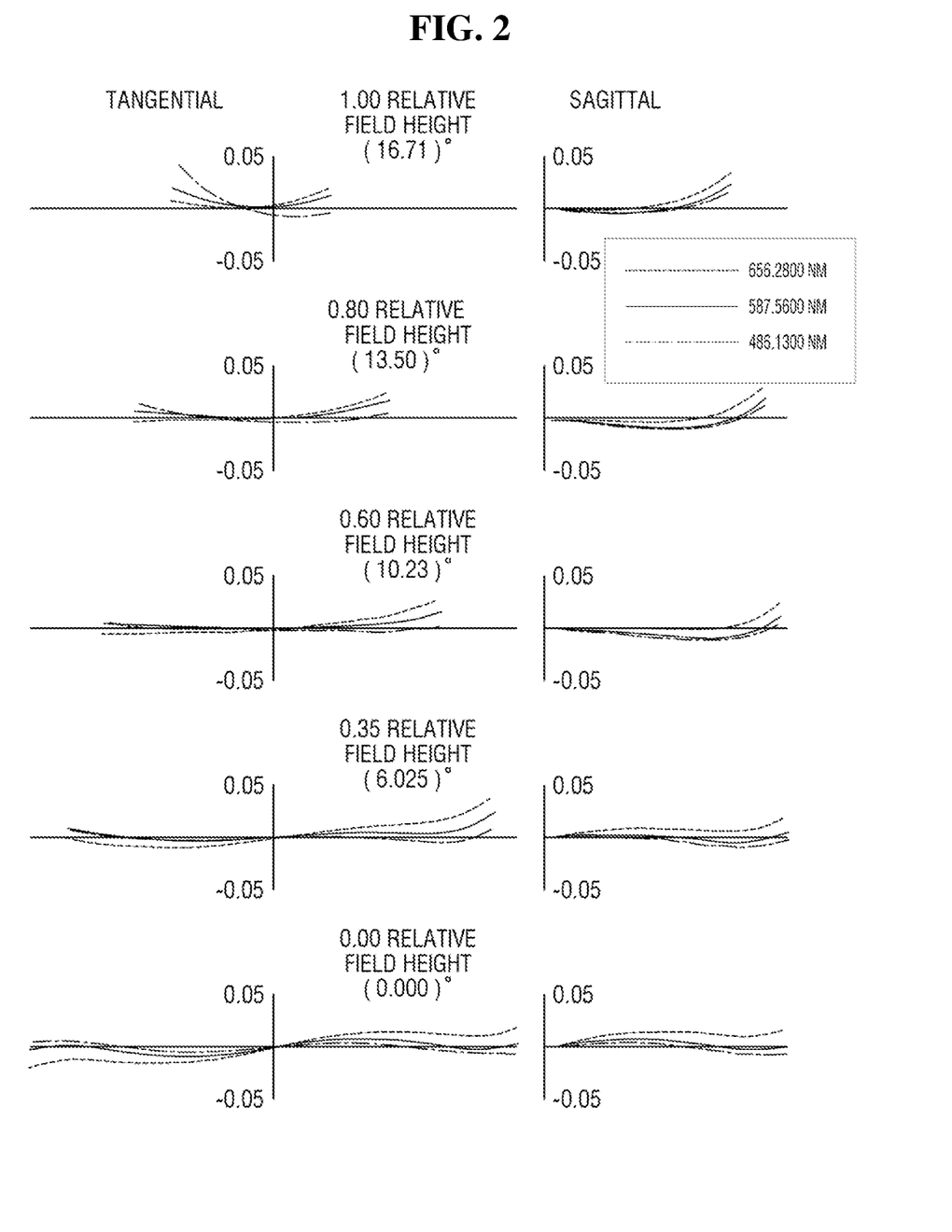
FIG. 2 is a view showing a ray fan diagram of the lens optical system at an infinite distance, according to the first embodiment of the present invention.

FIG. 2 is a view showing a ray fan diagram of the lens optical system at an infinite distance, according to the first embodiment of the present invention shown in FIG. 1. Here, a dotted line denotes a ray fan (unit: mm) for 656.28 NM wavelength (C-line), a solid line denotes a ray fan for a 587.56 NM wavelength (d-line), and a dashed line denotes a ray fan for a 486.13 NM wavelength (F-line).

These ray fans are plotted as a ray fan graph for the respective Tangential and Sagittal planes when the relative field heights are 0F, 0.35F, 0.60F, 0.80F and 1.00F.

Figure 3:
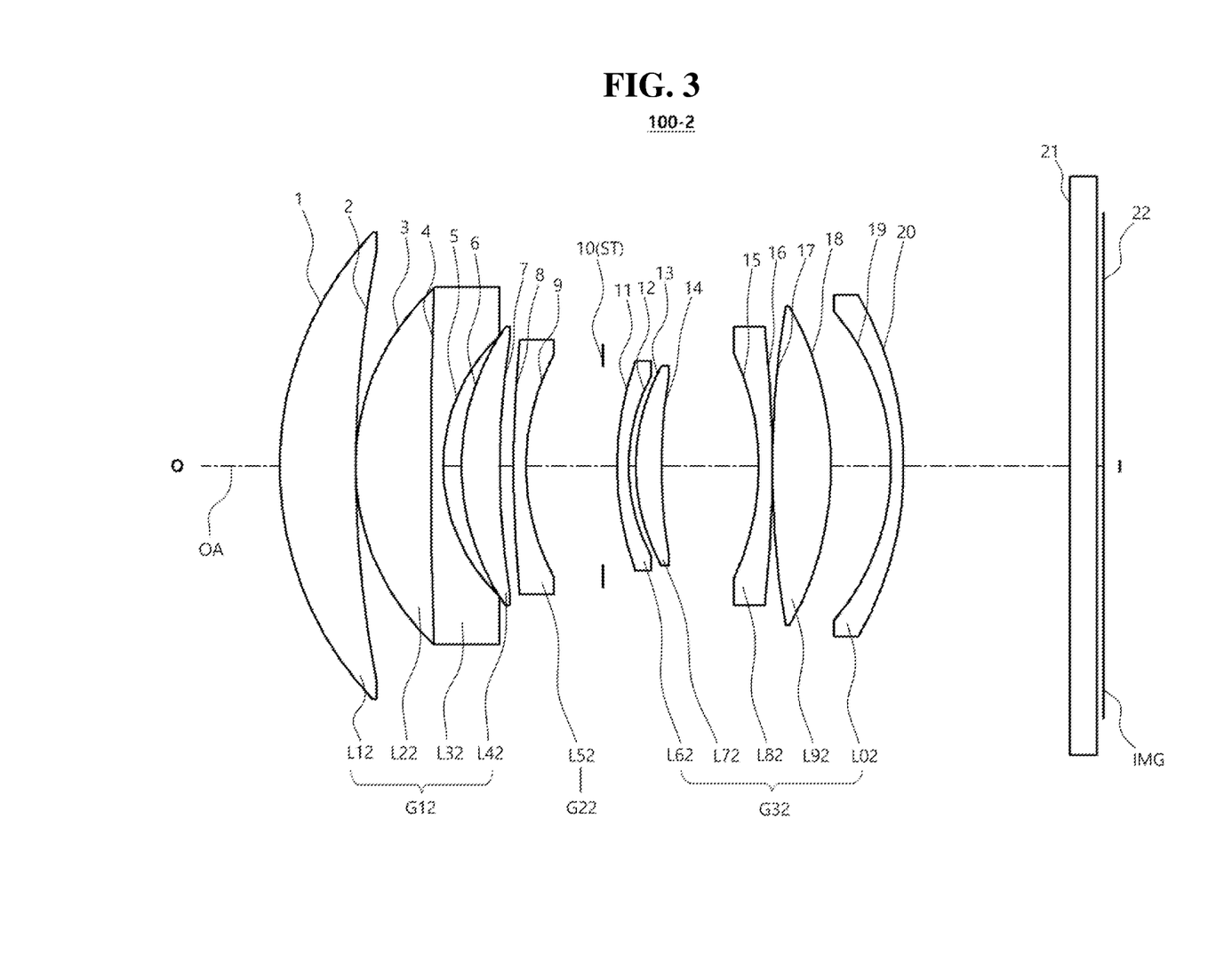
FIG. 3 is a view showing an optical layout showing an arrangement of lens components in a lens optical system according to a second embodiment of the present invention.

FIG. 3 is a view showing an optical layout showing an arrangement of lens components in a lens optical system according to a second embodiment of the present invention.

A lens optical system 100-2 includes a first lens group G12 having a positive refractive power, a second lens group G22 having a negative refractive power, and a third lens group G32 having a positive refractive power, which are arranged in order from an object side O to an image side I. In focusing, the first lens group G12 and the third lens group G32 are fixed to maintain a constant length of the overall length, and the second lens group G22 which is comprised of one lens in the middle may be moved.

In the lens optical system according to various embodiments, the first lens group G12 may embody a wide angle by emitting light with a positive refractive power. In addition, an aperture ST may be arranged between the first lens group G12 and the second lens group G22.

When focusing from infinity to the nearest distance, the first lens group G12 and the third lens group G32 are fixed, the second lens group G22 may move independently and moves from the image side I to the object side O. When the first lens group G12 and the third lens group G32 are fixed in focusing, damage or impairment to the lens due to the protrusion of the first lens group G12 may be reduced, and it may contribute to miniaturization of the lens optical system by preventing an increase in length of the overall length.

In a general wide-angle lens optical system, a diameter of a lens positioned closest to the object side O increases, and an aspheric surface may be employed inside the first lens group positioned closest to the object side O so as to minimize aberration changes due to focusing. Further, in the present invention, an aspheric lens may be provided in the third lens group having a relatively small aperture. In a bright lens optical system having a small F number Fno, the aspheric lens must be employed to achieve sufficient resolution performance and small distortion. Therefore, the aspheric surface is employed, in which the aspheric surface is employed in the third lens group G32 positioned at the rear of the small aperture so that the maximum resolution performance may be obtained at a small cost. Preferably, the aspheric surface may be employed on the object side O surface of the lens positioned on the image side I immediately behind the aperture ST in order to increase the center resolution performance. In addition, the aspheric lens may be arranged on the uppermost side I of the third lens group G32 for correction of astigmatism and distortion.

Referring to FIG. 3, the first lens group G12 may include a first lens L12 having a positive refractive power, a second lens L22 having a positive refractive power, a third lens L32 having a negative refractive power, and a fourth lens L42 having a positive refraction power. Among them, the second lens L22 and the third lens L32 may be double-junction lenses bonded to each other.

Each lens L12 to L42 may have a meniscus shape convex toward the object side O, the first lens L12, the second lens L22 and the fourth lens L42 may be a convex lens, and the third lens L32 may be a concave lens.

The second lens group G22 may be comprised of a fifth lens L52 having a negative refractive power. The fifth lens L52 may be a concave lens and have the meniscus shape convex toward the object side O.

The third lens group G32 may include a sixth lens L62 having a negative refractive power, a seventh lens L72 having a positive refractive power, an eighth lens L82 having a negative refractive power, a ninth lens L92 having a positive refractive power and a tenth lens L02 having a negative refractive power. The sixth lens L62 and the seventh lens L72 may have the meniscus shape convex toward the object side O and may be double-junction lenses bonded to each other. In addition, the eighth lens L82 and the tenth lens L02 may have the meniscus shape convex toward the image side I and the ninth lens L92 may be a biconvex lens.

The lens optical system according to the second embodiment has the following characteristic values as a whole by a combination of individual lenses. Here, f denotes a focal length, Fno denotes an F number, and HFOV denotes a half angle of view.

f=73.77 mm, Fno: 1.86, HFOV=16.3°

In addition, detailed design data of the lenses included in the lens optical system is shown in Table 3 below. The design data indicates information such as a curvature radius of a lens, a thickness of a lens, an interval between lenses, a material of a lens material, or the like. Here, an object on the lens surface is added with a number (see the numbering of 1 to 22 in FIG. 3) indicating a surface of all lenses arranged from the object to the image. In addition, the unit of Radius and Thickness is mm, "nd" denotes a refractive index, and "vd" denotes an Abbe number.

TABLE 3

| Surface | Radius | Thickness | nd | vd | Note |
| --- | --- | --- | --- | --- | --- |
| Object | Inf | D0 | | | |
| 1 | 34.395 | 7.352 | 2.001 | 29.13 | Group 1 |
| 2 | 116.6003 | 0.1 | | | Fix |
| 3 | 24.9601 | 7.275 | 1.497 | 81.61 | |
| 4 | 578.3749 | 1.2 | 1.84666 | 23.78 | |
| 5 | 17.9039 | 1.778 | | | |
| 6 | 25.2284 | 3.694 | 1.7433 | 49.22 | |
| 7 | 89.6053 | D1 | | | |
| 8 | 134.3808 | 1.2 | 1.7725 | 49.62 | Group 2 |
| 9 | 24.2266 | D2 | | | focusing |
| 10 (STO) | inf | 1.5 | | | Group 3 |
| 11 | 32.0319 | 1.2 | 1.80518 | 25.46 | Fix |
| 12 | 20.6977 | 0.491 | | | |
| 13 | 20.6801 | 2.649 | 1.437 | 95.1 | |
| 14 | 61.9132 | 9.497 | | | |
| 15 | −25.7828 | 1.2 | 1.497 | 81.61 | |
| 16 | −142.789 | 0.1 | | | |
| 17 | 100.9443 | 5.704 | 2.001 | 29.13 | |
| 18 | −32.8823 | 5.808 | | | |
| 19 | −24.2726 | 1.2 | 1.94595 | 17.98 | |
| 20 | −35.2492 | 16.309 | | | |
| 21 | inf | 2.5 | 1.5168 | 64.2 | Filter |
| 22 | inf | D3 | | | |

Further, zoom data of the lens optical system according to the second embodiment when it is at infinity and at 0.60 m in the second embodiment, is shown in Table 4 below. Here, D0 to D2 denote a variable distance, and "in Air" denotes a distance from the last surface of the optical system to the imaging device when there is no filter positioned in front of the imaging device. In addition, FOV is a field of view, which means a size of an area visible to the imaging device, and Fno means an F number. In addition, OAL denotes an overall length of the lens optical system, and denotes a distance from the object side to the image plane of the lens closest to the object side O of the lens optical system.

TABLE 4

| Config | Infinity | TL = 0.60 m |
| --- | --- | --- |
| D0 | infinity | 520.0044 |
| D1 | 1.31768 | 6.28649 |
| D2 | 7.42417 | 2.45535 |
| D3 | 0.5 | 0.5 |
| in Air | 18.607 | 18.825 |
| EFL/MAG | 73.7684 | 0.15087 |
| FOV | 16.331 | 13.209 |
| F/# | 1.862 | 2.012 |
| OAL | 80.555 | 80.555 |

Figure 4:
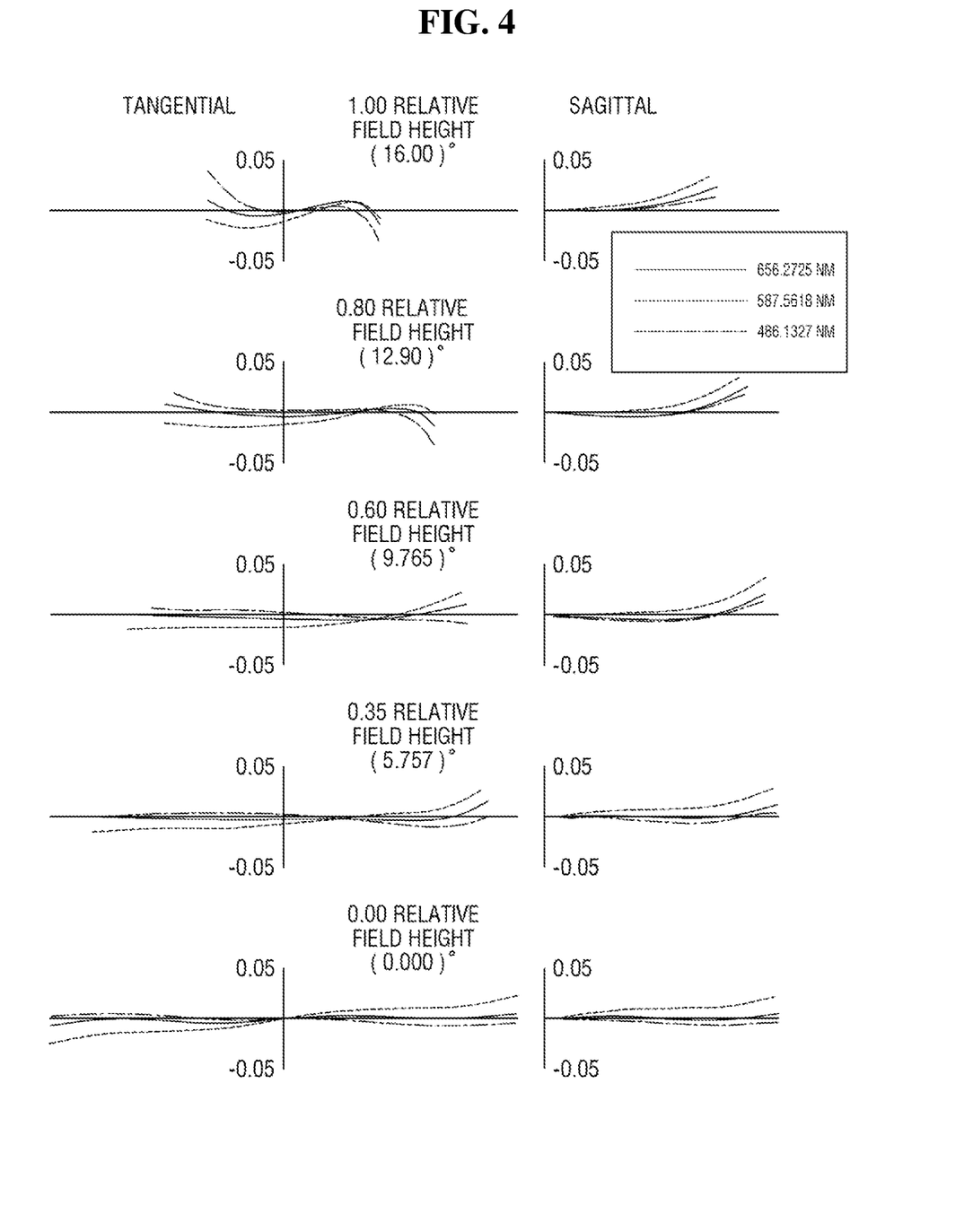
FIG. 4 is a view showing a ray fan diagram of the lens optical system at an infinite distance, according to the second embodiment of the present invention.

FIG. 4 is a view showing a ray fan diagram of the lens optical system at an infinite distance, according to the second embodiment of the present invention shown in FIG.

3. Here, a dotted line denotes a ray fan (unit: mm) for 656.28 NM wavelength (C-line), a solid line denotes a ray fan for a 587.56 NM wavelength (d-line), and a dashed line denotes a ray fan for a 486.13 NM wavelength (F-line).

These ray fans are plotted as a ray fan graph for the respective Tangential and Sagittal planes when the relative field heights are 0F, 0.35F, 0.60F, 0.80F and 1.00F.

Figure 5:
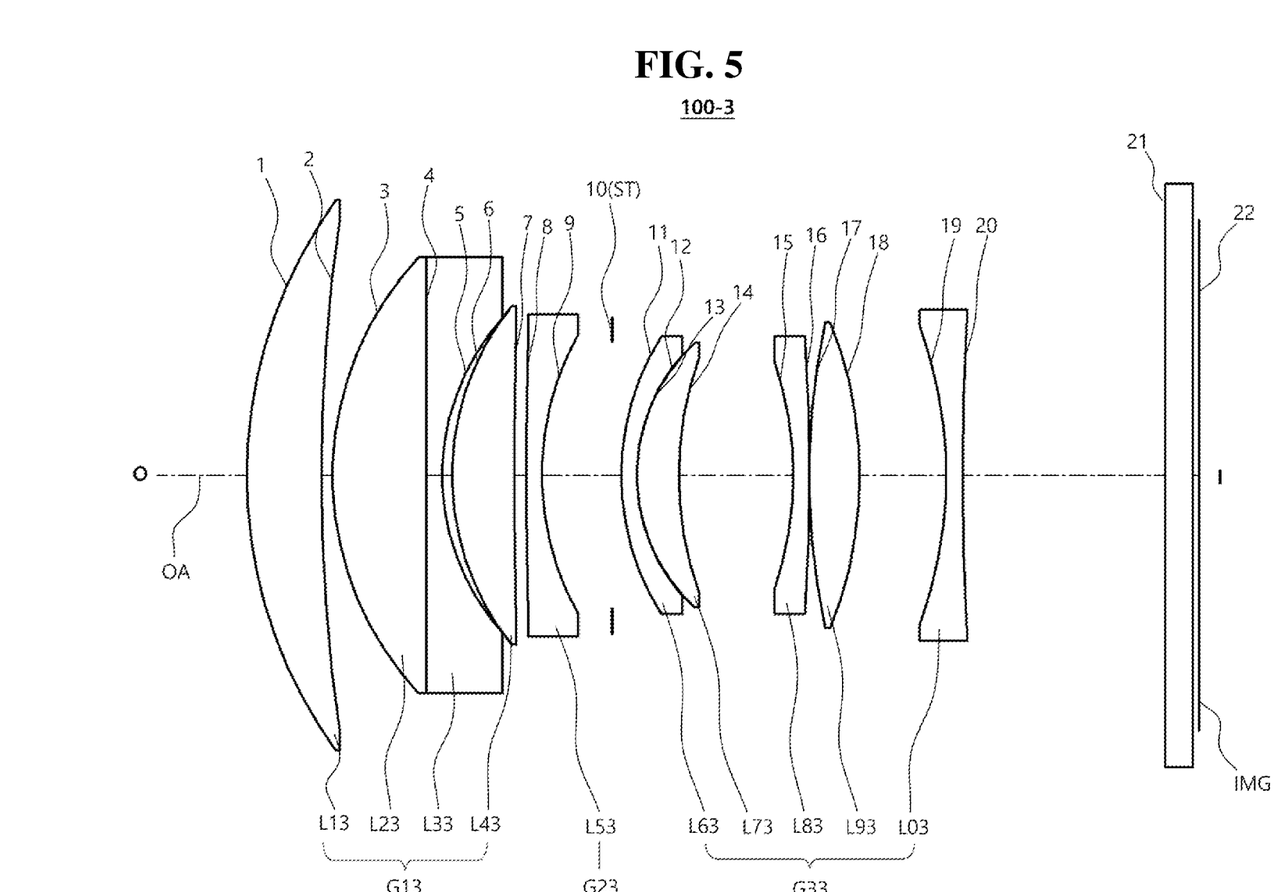
FIG. 5 is a view showing an optical layout showing an arrangement of lens components in a lens optical system according to a third embodiment of the present invention.

FIG. 5 is a view showing an optical layout showing an arrangement of lens components in a lens optical system according to a third embodiment of the present invention.

A lens optical system 100-3 includes a first lens group G13 having a positive refractive power, a second lens group G23 having a negative refractive power, and a third lens group G33 having a positive refractive power, which are arranged in order from an object side O to an image side I. In focusing, the first lens group G13 and the third lens group G33 are fixed to maintain a constant length of the overall length, and the second lens group G23 which is comprised of one lens in the middle may be moved.

In the lens optical system according to various embodiments, the first lens group G13 may embody a wide angle by emitting light with a positive refractive power. In addition, an aperture ST may be arranged between the first lens group G13 and the second lens group G23.

When focusing from infinity to the nearest distance, the first lens group G13 and the third lens group G33 are fixed, the second lens group G23 may move independently and moves from the image side I to the object side O. When the first lens group G13 and the third lens group G33 are fixed in focusing, damage or impairment to the lens due to the protrusion of the first lens group G13 may be reduced, and it may contribute to miniaturization of the lens optical system by preventing an increase in length of the overall length.

In a general wide-angle lens optical system, a diameter of a lens positioned closest to the object side O increases, and an aspheric surface may be employed inside the first lens group positioned closest to the object side O so as to minimize aberration changes due to focusing. Further, in the present invention, an aspheric lens may be provided in the third lens group having a relatively small aperture. In a bright lens optical system having a small F number Fno, the aspheric lens must be employed to achieve sufficient resolution performance and small distortion. Therefore, the aspheric surface is employed, in which the aspheric surface is employed in the third lens group G33 positioned at the rear of the small aperture so that the maximum resolution performance may be obtained at a small cost. Preferably, the aspheric surface may be employed on the object side O surface of the lens positioned on the image side I immediately behind the aperture ST in order to increase the center resolution performance. In addition, the aspheric lens may be arranged on the uppermost side I of the third lens group G33 for correction of astigmatism and distortion.

Referring to FIG. 5, the first lens group G13 may include a first lens L13 having a positive refractive power, a second lens L23 having a positive refractive power, a third lens L33 having a negative refractive power, and a fourth lens L43 having a positive refraction power. Among them, the second lens L23 and the third lens L33 may be double-junction lenses bonded to each other.

Each lens L13 to L43 may have a meniscus shape convex toward the object side O, the first lens L11, the second lens L23 and the fourth lens L43 may be a biconvex lens, and the third lens L33 may be a biconcave lens.

The second lens group G23 may be comprised of a fifth lens L53 having a negative refractive power. The fifth lens L53 may be a concave lens and have the meniscus shape convex toward the object side O.

The third lens group G33 may include a sixth lens L63 having a negative refractive power, a seventh lens L73 having a positive refractive power, an eighth lens L83 having a negative refractive power, a ninth lens L93 having a positive refractive power and a tenth lens L03 having a negative refractive power. The sixth lens L63 and the seventh lens L73 may have the meniscus shape convex toward the object side O and may be double-junction lenses bonded to each other. In addition, the eighth lens L83 may have the meniscus shape convex toward the image side I, the ninth lens L93 may be a biconvex lens and the tenth lens L03 may be a biconcave lens.

The lens optical system according to the third embodiment has the following characteristic values as a whole by a combination of individual lenses. Here, f denotes a focal length, Fno denotes an F number, and HFOV denotes a half angle of view.

f=80 mm, Fno: 1.86, HFOV=13.9°

In addition, detailed design data of the lenses included in the lens optical system is shown in Table 5 below. The design data indicates information such as a curvature radius of a lens, a thickness of a lens, an interval between lenses, a material of a lens material, or the like. Here, an object on the lens surface is added with a number (see the numbering of 1 to 22 in FIG. 5) indicating a surface of all lenses arranged from the object to the image. In addition, the unit of Radius and Thickness is mm, "nd" denotes a refractive index, and "vd" denotes an Abbe number.

TABLE 5

| Surface | Radius | Thickness | nd | vd | Note |
|---|---|---|---|---|---|
| Object | Inf | D0 | | | |
| 1 | 43.2978 | 6.586 | 2.00069 | 25.46 | Group 1 |
| 2 | 170.0702 | 0.956 | | | Fix |
| 3 | 29.3091 | 8.462 | 1.497 | 81.61 | |
| 4 | −1934.1 | 1.4 | 1.84666 | 23.78 | |
| 5 | 21.6294 | 0.919 | | | |
| 6 | 25.257 | 5.516 | 1.497 | 81.61 | |
| 7 | 610.7925 | D1 | | | |
| 8 | 539.4595 | 1.4 | 1.62299 | 58.12 | Group 2 |
| 9 | 26.8241 | D2 | | | focusing |
| 10 (STO) | inf | 1.5 | | | Group 3 |
| 11 | 23.686 | 1.4 | 1.80809 | 22.76 | Fix |
| 12 | 16.4951 | 0.1 | | | |
| 13 | 16.5415 | 3.641 | 1.497 | 81.61 | |
| 14 | 33.2238 | 10.229 | | | |
| 15 | −34.1814 | 1.4 | 1.497 | 81.61 | |
| 16 | −221.938 | 0.1 | | | |
| 17 | 72.0646 | 4.42 | 1.90366 | 31.31 | |
| 18 | −37.8963 | 7.741 | | | |
| 19 | −46.4327 | 1.4 | 1.6722 | 55.48 | |
| 20 | 452.385 | 18.237 | | | |
| 21 | inf | 2.5 | 1.5168 | 64.2 | Filter |
| 22 | inf | D3 | | | |

Further, zoom data of the lens optical system according to the third embodiment when it is at infinity and at 1.0 m in the third embodiment, is shown in Table 6 below. Here, D0 to D2 denote a variable distance, and "in Air" denotes a distance from the last surface of the optical system to the imaging device when there is no filter positioned in front of the imaging device. In addition, FOV is a field of view, which means a size of an area visible to the imaging device, and Fno means an F number. In addition, OAL denotes an overall length of the lens optical system, and denotes a distance from the object side to the image plane of the lens closest to the object side O of the lens optical system.

TABLE 6

| Config | Infinity | TL = 1.0 m |
|---|---|---|
| D0 | infinity | 919.9956 |
| D1 | 1 | 4.61349 |
| D2 | 6.27761 | 2.66412 |
| D3 | 0.5 | 0.5 |
| in Air | 20.373 | 20.484 |
| EFL/MAG | 80 | 0.09082 |
| FOV | 13.944 | 12.473 |
| F/# | 1.826 | 1.936 |
| OAL | 85 | 85 |

Figure 6:
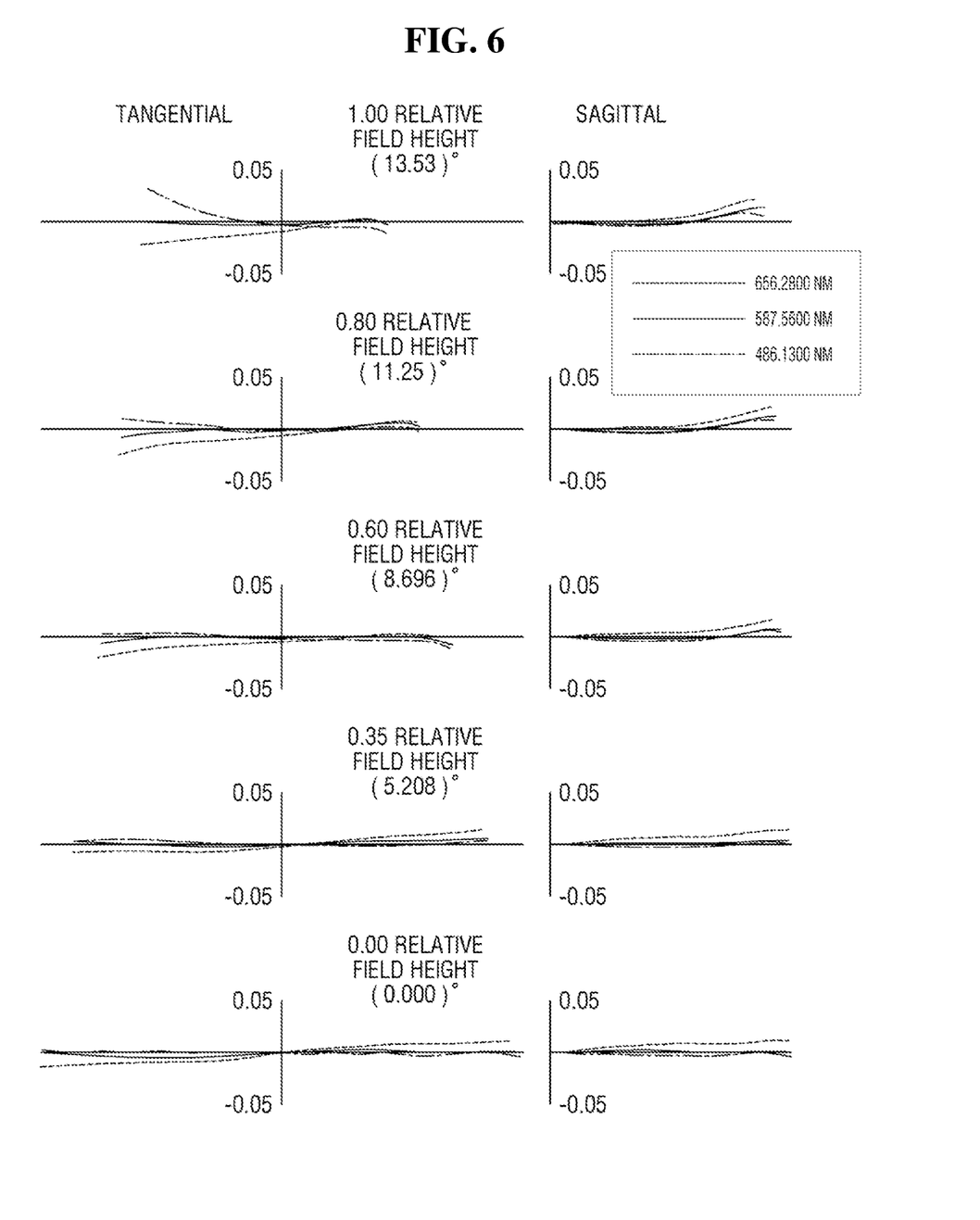
FIG. 6 is a view showing a ray fan diagram of the lens optical system at an infinite distance, according to the third embodiment of the present invention.

FIG. 6 is a view showing a ray fan diagram of the lens optical system at an infinite distance, according to the third embodiment of the present invention shown in FIG. 5. Here, a dotted line denotes a ray fan (unit: mm) for 656.28 NM wavelength (C-line), a solid line denotes a ray fan for a 587.56 NM wavelength (d-line), and a dashed line denotes a ray fan for a 486.13 NM wavelength (F-line).

These ray fans are plotted as a ray fan graph for the respective Tangential and Sagittal planes when the relative field heights are 0F, 0.35F, 0.60F, 0.80F and 1.00F.

In the above three embodiments, indicators representing the respective optical characteristics are summarized in Table 7 below. Here, BFL is a distance from the last lens surface of the third lens group G31, G32, G33 to the imaging device surface (IMG), FL is a distance from the first lens surface of the first lens group G11, G12, G13 to the imaging device surface, and w is the field of view of the lens optical system 101-1, 101-2, 101-3.

In addition, $L_1$ is a distance from the first lens L11, L21, L31 to the last lens L41, L42, L43 in the first lens group, $L_3$ is a distance from the first lens L61, L62, L63 to the last lens L01, L02, L03 in the third lens group, and 2fd is a travel range of the single lens L51, L52, L53 in the second lens group when focusing from infinity to the nearest distance.

Further, $R2_{rear}$ is a curvature radius of the last lens surface (numeral 9 in FIGS. 1, 2 and 3) of the lens L51, L52, L53 in the second lens group, f2 is a focal length of the second lens group, and $n_{av}$ is an average refractive index of all the lenses used in the lens optical system 101-1, 101-2, 101-3.

TABLE 7

| | First embodiment | Second embodiment | Third embodiment |
|---|---|---|---|
| FL | 84.313 | 80.555 | 85 |
| BFL | 20.63 | 18.60 | 20.37 |
| tan w | 17.196 | 16.331 | 13.944 |
| $L_1$ | 20.815 | 21.4 | 23.839 |
| $L_3$ | 30.446 | 27.849 | 30.413 |
| 2fd | 3.882 | 4.969 | 3.613 |
| $R2_{rear}$ | 24.885 | 24.227 | 26.824 |
| f2 | −36.79 | −38.26 | −45.17 |
| $n_{av}$ | 1.73446 | 1.73304 | 1.66901 |
| $3.8 \leq \dfrac{FL}{BFL} \leq 4.5$ | 4.086 | 4.329 | 4.172 |
| $0.5 \leq \tan w \leq 0.7$ | 0.6845 | 0.6410 | 0.5292 |
| $9 \leq \dfrac{L_1 + L_3}{2fd} \leq 17$ | 13.21 | 9.91 | 15.02 |
| $-0.69 \leq \dfrac{R2_{rear}}{f2} \leq -0.55$ | −0.6764 | −0.6332 | −0.5938 |
| $0.55 \leq \dfrac{1}{n_{av}} \leq 0.61$ | 0.57655 | 0.57702 | 0.59916 |

As described in various embodiments above, the optical system according to the present invention is a lens for photographing with stable resolution operating in a wide-angle area. It is characterized that since it is a short focus optical system, focusing is required to correct a position of an image point that changes depending on a position of a subject, in which the overall length of the optical system is fixed using the inner focusing in order to shorten the length of the overall length of the optical system, and it has a focusing group that is light-weight to realize high-speed auto-focusing (AF).

The lens optical system 100-1, 100-2, 100-3 described above is characterized by having a light-weight focusing group in order to implement a high-speed autofocus (AF) in a quasi-telephoto lens optical system with a large aperture which has 13~18° and F/1.8 as a half field of view. Generally, a quasi-telephoto lens optical system has a slow AF speed because the focusing group has as long travel as the focal length of the optical system. In addition, the long travel of the focusing group limits the selection of a driving source.

In this regard, this invention proposes conditions in which you can implement a high-speed AF and freely select the driving source by minimizing the travel of the focusing group according to the object distance.

According to the conditions, the lens optical system 100-1, 100-2, 100-3 is comprised of three lens groups.

The first lens in the first lens group has a meniscus shape and a positive refractive power, and the first lens group also has a positive refractive power. In addition, the first lens group further includes double-junction lenses which have a negative refractive power.

The second lens group is comprised of a single focusing lens having a negative refractive power, and the third lens group is comprised of a plurality of lenses and has a positive refractive power. The lenses in the lens optical system may be a spherical or aspherical lens.

Specifically, the second lens group is a focusing group for compensating the change in the image distance according to the change in the object distance, and the overall length of the lens optical system is maintained since the first and the third lens group does not move while focusing.

Specifically, the lens groups in the lens optical system 100-1, 100-2, 100-3 satisfies the following condition described in the equation 1.

$$3.8 \leq \frac{FL}{BFL} \leq 4.5 \qquad \text{[Equation 1]}$$

Here, BFL is a distance from the last lens surface of the third lens group to the imaging device surface (IMG) and FL is a distance from the first lens surface of the first lens group to the imaging device surface.

Further, the field of view of the lens optical system (w) satisfies the following equation 2.

$$0.5 \leq \tan w \leq 0.7 \qquad \text{[Equation 2]}$$

The above equations 1 and 2 provide a basic arrangement for the designed refraction power to establish a quasi-telephoto lens optical system whose overall length does not change even during the auto-focusing. This feature contributes to lightening the focusing group because the aperture of the second lens group can be reduced when the first lens group has a positive refraction power.

On the other hand, it is difficult to lighten a lens optical system in which many lenses are used even though the aperture of the focusing group is reduced. Accordingly, the equations 1 and 2 means conditions for lightening the focusing group without changing the overall length of the lens optical system while focusing.

As described above, the first lens group has a positive refraction power. This is not only a condition for the light-weight of the focusing group (the second lens group) but also a characteristic of a telephoto lens optical system which has a narrow-angle field of view. The telephoto lens optical system includes a combination of a lens group having a positive refraction powers and another lens group having a negative refraction power, which is called a telephoto type.

Generally, aspherical lenses are used for enhancing the performance of the lens optical system with a large aperture, but the overall cost rises due to the high unit price of the aspherical lens. Accordingly, a combination of a single aspherical lens and spherical lenses for each lens group can contribute to a price competitiveness.

More preferably, the lens optical system according to the present invention satisfies the following equation 3.

$$9 \leq \frac{L_1 + L_3}{2fd} \leq 17 \qquad \text{[Equation 3]}$$

Here, $L_1$ is a distance from the first lens to the last lens in the first lens group, $L_3$ is a distance from the first lens to the last lens in the third lens group, and 2fd is a travel range of the single lens in the second lens group when focusing from infinity to the nearest distance.

The equation 3 is a condition for limiting a focus movement and the overall length of the lens optical system. It is difficult to shorten the overall length of the lens optical system if it is over the upper limit of the equation 3. On the other hand, the lower limit guarantees a proper overall length of the lens optical system so that the focus movement is not too small. If the focus movement is too small, the change in the performance according to the focusing is too sensitive, and thus the driving source should be accurate that much.

As described above, the third lens group in the lens optical system is used as a field flattener to compensate the Petzval curvature.

In addition, the lenses except for the last lens in the third lens group has cumulatively a positive refraction power, and the first lens group has a positive refraction power as well. Further, a light convergence and chromatic aberration can be properly compensated because the first lens group includes double-junction lenses which have a negative refractive power.

Further, the focusing group (the second lens group) is comprised of a single lens which is a concave lens and has a negative refraction power. Preferably, the single lens can be a uni-concave lens or biconcave lens to provide a strong negative refraction power for minimizing the movement of the single lens during the focusing. To this end, it is possible to satisfy an aplanatic condition in which a spherical aberration and a coma are compensated at the same time, by positioning the lens surface having a smaller curvature radius in the single lens to the vicinity of the image side I.

The curvature radius of the lens surface has a positive value according to a sign rule in an optical design software and preferably satisfies the following equation 4.

$$-0.69 \leq \frac{R2_{rear}}{f2} \leq -0.55 \qquad \text{[Equation 4]}$$

Here, $R2_{rear}$ is a curvature radius of the last lens surface of the single lens in the second lens group and f2 is a focal length of the second lens group.

The upper limit of the equation 4 is a condition for increasing the refraction power due to its small curvature radius, and the lower limit of the equation 4 is a condition for decreasing the refraction power due to its large curvature radius close to the flat plane. These upper and lower limits are designed in consideration of the characteristic—the performance according to the movement of the focusing group decreases if the refraction power is too high, while the travel range of the focusing group is excessively large if the refraction power is too low.

Meanwhile, it is necessary to satisfy the following equation 5 in order to compensate Petzval curvature in the lens optical system and place the refractive indices of the used lenses within a proper range.

$$0.55 \leq \frac{1}{n_{av}} \leq 0.61 \qquad \text{[Equation 5]}$$

Here, $n_{av}$ is an average refractive index of all the lenses used in the lens optical system.

Petzval curvature can be minimized according as $n_{av}$ increases in the equation 5. However, this may cause the overall cost rise due to the high price of the lenses having high refraction powers. On the other hand, it is possible to cut down the overall cost using lenses having low refraction powers but it makes it difficult to compensate Petzval curvature. Accordingly, the upper and lower limits in the equation 5 provide conditions for reducing the overall cost of the lens optical system with properly compensating Petzval curvature.

As a result, according the embodiment, there is provided a lens optical system which enables a high-performance and high-speed autofocus for a quasi-telephoto lens optical system.

Figure 7:
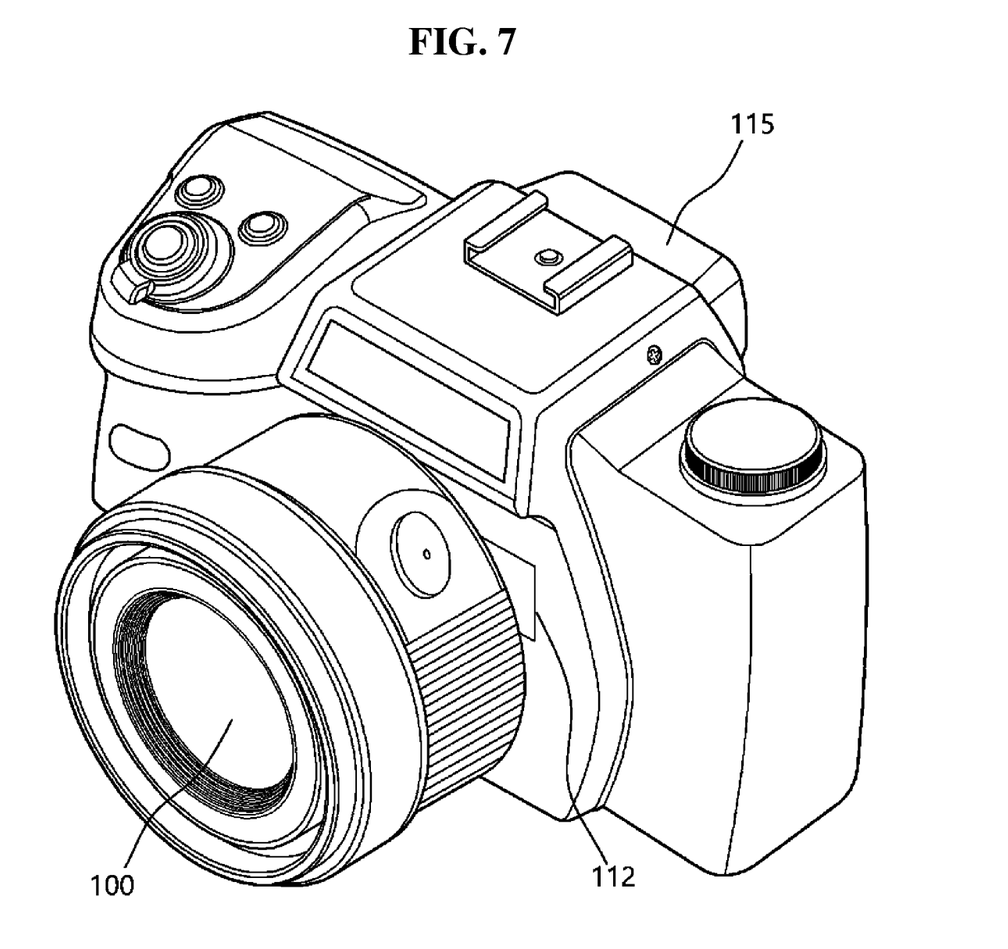
FIG. 7 shows a photographing apparatus having the lens optical system according to the embodiments of the present invention.

FIG. 7 shows a photographing apparatus having the lens optical system 100 according to the embodiments of the present invention. The lens optical system 100 is substantially the same as the lens systems 100-1, 100-2, and 100-3 described with reference to FIGS. 1, 3 and 5. The photographing apparatus may include an image sensor 112 that receives light formed by the lens optical system 100. And, it may be provided with a display 115 on which an image of a subject is displayed.

According to the lens optical system described above, it is possible to maintain the overall length of the lens optical system by moving only a single lens inside the lens optical system and this feature contributes to enhancing a user's convenience and a robustness to circumstances such as dustproof and waterproof Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims.

What is claimed is:

1. A lens optical system, comprising:
a first lens group in which a first lens of an object side is composed of a meniscus lens having a first positive refractive power, wherein the first lens group has a second positive refractive power as a whole;
a second lens group arranged closer to an image side I than the first lens group, the second lens group being a focusing group for correcting a change in image distance depending on a change in object distance, being composed of a single lens, and having a first negative refractive power as a whole; and
a third lens group arranged closer to the image side I than the second lens group, wherein the third lens group has a third positive refractive power as a whole and comprises a sixth lens having a second negative refractive power, a seventh lens having a fourth positive refractive power, an eighth lens having a third negative refractive power, a ninth lens having a fourth negative refractive power and a tenth lens having a fifth negative refractive power, wherein the sixth lens and the seventh lens have a meniscus shape convex toward the image side I and are double-junction lenses bonded to each other, the eighth lens and the tenth lens have the meniscus shape convex toward the image side I, and the ninth lens is a biconvex lens,
wherein when the second lens group is focused while moving, the first lens group and the third lens group are fixed to have a constant length of an overall length,
wherein the lens optical system satisfies the following equation:

$$3.8 \leq \frac{FL}{BFL} \leq 4.5,$$

wherein BFL is a distance from the last lens surface of the third lens group to an imaging device surface (IMG), and FL is a distance from the first lens surface of the first lens group to the IMG,
wherein the lens optical system further satisfies the following equation:

$$0.5 \leq \tan w \leq 0.7,$$

wherein w is the field of view of the lens optical system, and
wherein the lens optical system further satisfies the following equation:

$$9 \leq \frac{L_1 + L_3}{2fd} \leq 17,$$

wherein, $L_1$ is a distance from the first lens to the last lens in the first lens group, L3 is a distance from the first lens to the last lens in the third lens group, and 2fd is a travel range of the single lens in the second lens group when focusing from infinity to the nearest distance.

2. The system of claim 1, wherein an aspherical lens is included in each of the first to the third lens group.

3. The system of claim 2, wherein the first lens group includes double-junction lenses which have a negative refractive power.

4. The system of claim 1, wherein the lens optical system further satisfies the following equation:

$$-0.69 \leq \frac{R2_{rear}}{f2} \leq -0.55,$$

wherein, $R2_{rear}$ is a curvature radius of the last lens surface of the single lens in the second lens group and f2 is a focal length of the second lens group.

5. The system of claim 4, wherein the lens optical system further satisfies the following equation:

$$0.55 \leq \frac{1}{n_{av}} \leq 0.61,$$

wherein, $n_{av}$ an average refractive index of all the lenses used in the lens optical system.

* * * * *